United States Patent
Hepworth et al.

(10) Patent No.: US 7,519,239 B2
(45) Date of Patent: Apr. 14, 2009

(54) SYSTEMS AND METHODS FOR CONCURRENT IMAGE CAPTURE AND DECODING OF GRAPHICAL CODES

(75) Inventors: Paul Hepworth, Riverton, UT (US); George Powell, Sandy, UT (US)

(73) Assignee: The Code Corporation, Bluffdale, UT (US)

( * ) Notice: Subject to any disclaimer, the term of this patent is extended or adjusted under 35 U.S.C. 154(b) by 843 days.

(21) Appl. No.: 10/776,449

(22) Filed: Feb. 11, 2004

(65) Prior Publication Data

US 2005/0173534 A1     Aug. 11, 2005

(51) Int. Cl.
G06K 9/54    (2006.01)
G06K 9/60    (2006.01)
G06K 9/00    (2006.01)
G06K 7/10    (2006.01)
G06K 7/14    (2006.01)

(52) U.S. Cl. .................. 382/318; 382/307; 235/454
(58) Field of Classification Search ............. 382/318, 382/143, 307; 235/454; 718/102, 101
See application file for complete search history.

(56) References Cited

U.S. PATENT DOCUMENTS

| | | | |
|---|---|---|---|
| 4,488,679 A | 12/1984 | Bockholt et al. | |
| 4,896,029 A | 1/1990 | Chandler et al. | |
| 4,998,010 A | 3/1991 | Chandler et al. | |
| 5,153,418 A | 10/1992 | Batterman et al. | |
| 5,189,292 A | 2/1993 | Batterman et al. | |
| 5,223,701 A | 6/1993 | Batterman et al. | |
| 5,343,028 A | 8/1994 | Figarella et al. | |
| 5,352,878 A | 10/1994 | Smith et al. | |
| 5,412,196 A | 5/1995 | Surka | |
| 5,428,211 A | 6/1995 | Zheng et al. | |
| 5,438,188 A | 8/1995 | Surka | |
| 5,473,741 A * | 12/1995 | Neufelder et al. | 345/619 |
| 5,478,999 A | 12/1995 | Figarella et al. | |
| 5,483,052 A | 1/1996 | Smith, III et al. | |
| 5,545,887 A | 8/1996 | Smith et al. | |
| 5,742,037 A * | 4/1998 | Scola et al. | 235/454 |
| 5,804,803 A | 9/1998 | Cragun et al. | |
| 6,384,744 B1 | 5/2002 | Philyaw et al. | |
| 6,993,210 B1 * | 1/2006 | Pine | 382/303 |
| 7,197,749 B2 * | 3/2007 | Thornton et al. | 718/101 |
| 2005/0146758 A1 * | 7/2005 | Tsuchihashi | 358/506 |

FOREIGN PATENT DOCUMENTS

EP         0 837 406         4/1998

OTHER PUBLICATIONS

"Punched Cards to Bar Codes," Benjamin Nelson, Helmers Publishing, Inc. 1997, pp. 1-16.
"Mini Code," http://www.omniplanar.com/minicode.html, pp. 1-10, May 17, 1999.

* cited by examiner

*Primary Examiner*—John B Strege
(74) *Attorney, Agent, or Firm*—Austin Rapp & Hardman

(57) ABSTRACT

Systems and methods for concurrent image capture and decoding of graphical codes are disclosed. In an exemplary method disclosed herein, a first image is captured by an image capture component in a graphical code reader. The first image is processed by a decoding component. Processing the first image involves searching for a graphical code within the first image and attempting to decode the graphical code. A second image is then captured by the image capture component while the first image is being processed by the decoding component.

10 Claims, 12 Drawing Sheets

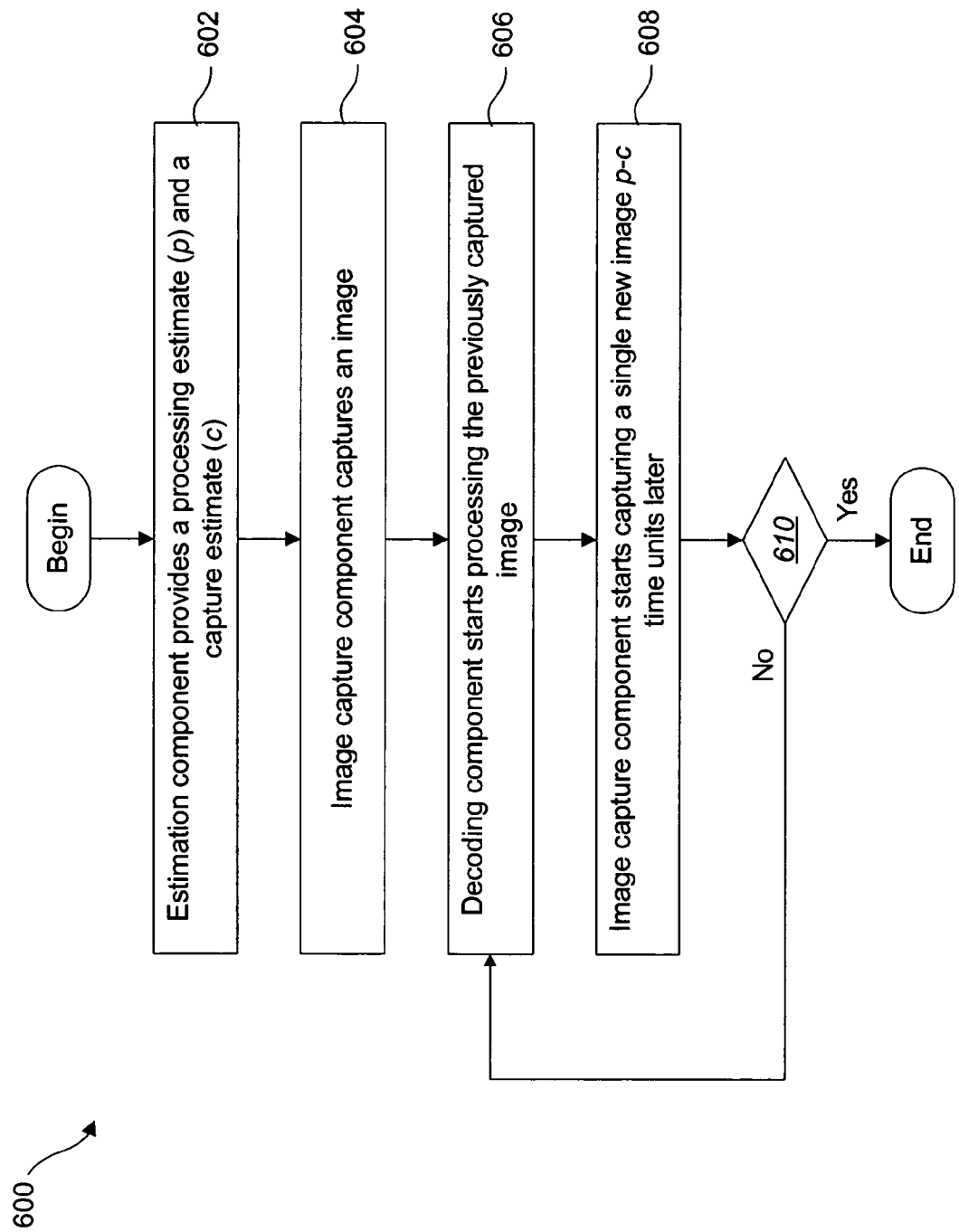

SYSTEMS AND METHODS FOR CONCURRENT IMAGE CAPTURE AND DECODING OF GRAPHICAL CODES

TECHNICAL FIELD

The present invention relates generally to graphical code readers. More specifically, the present invention relates to a graphical code reader that is configured to capture at least one new image while decoding a previously captured image.

BACKGROUND

Computer technology has entered many areas to simplify manual tasks and to make information more readily available. Computer programs can be used for many purposes including assisting a person in performing his or her job. For example, word processors help computer users prepare documents, spreadsheet programs help users perform accounting functions and numerical analysis, diagnostic programs assist users in diagnosing problems, etc. There are many programs available to help users with almost any need they may have.

One way to input data into a computer program involves the use of machine-readable graphical codes ("graphical codes"). A graphical code is a graphical representation of information that consists of multiple graphical code elements having different light reflective or light emissive properties. Examples of different types of graphical codes include bar codes, data matrix codes, MaxiCodes, and so forth. Graphical codes have become widely used in many commercial environments, such as point-of-sale stations in retail stores and supermarkets, inventory and document tracking, and the like.

Devices for identifying or extracting information from graphical codes are generally referred to as graphical code readers. Graphical code readers typically include one or more light sources for illuminating a graphical code. Light is reflected from the graphical code toward the graphical code reader. A lens within the graphical code reader focuses an image of the graphical code onto an image sensor. Pixels within the image sensor are read electronically to provide a two-dimensional array of image data corresponding to the graphical code. A decoder then processes the image data and extracts the information contained in the graphical code.

Two-dimensional graphical codes possess several advantages over one-dimensional graphical codes. For example, two-dimensional graphical codes are designed to store considerably more information than one-dimensional graphical codes. In addition, two-dimensional graphical codes are typically smaller than one-dimensional codes. Also, in some cases, two-dimensional graphical codes do not require a high level of print quality in order to be decoded.

Known graphical code readers sequentially perform the functions of image capture and decoding. That is, known graphical code readers capture an image. When the image is fully captured, the captured image is processed (i.e., an attempt is made to locate and decode graphical codes in the image). When the image has been fully decoded, another image is captured. This process is then typically repeated until a successful decoding operation is performed (i.e., a graphical code is located in an image and the graphical code is successfully decoded). However, benefits may be realized by a graphical code reader that is configured for concurrent image capture and decoding.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 6 is a flow diagram illustrating another embodiment of a method for concurrent image capture and decoding;

DETAILED DESCRIPTION

Figure 1:
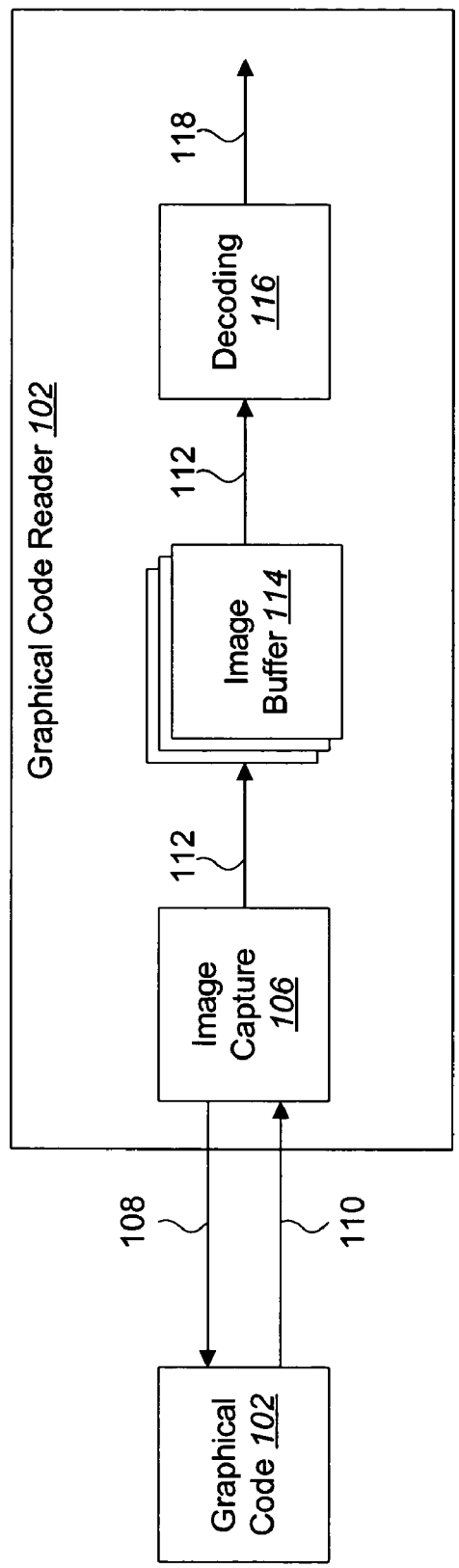
FIG. 1 is a block diagram illustrating functional components in an embodiment of a graphical code reader that is configured for concurrent image capture and decoding.

A method in a graphical code reader for concurrent image capture and decoding is disclosed. The method involves capturing a first image. The first image is processed by searching for a graphical code within the first image and attempting to decode the graphical code. A second image is captured while the first image is being processed.

In some embodiments, the capturing of the second image starts when the processing of the first image starts. Alternatively, the method may involve determining an estimated processing time p for processing at least some of the first image, and determining an estimated capture time c for capturing the second image. In such embodiments, the capturing of the second image may start p−c time units after the processing of the first image starts. The method may also involve stopping the processing of the first image p time units after the processing of the first image starts.

The estimated processing time p may be an estimate of an amount of time required to process the entire first image. Alternatively, the estimated processing time p may be an estimate of an amount of time required to process a portion of the first image. In such embodiments, the estimated processing time p may be a function of at least one of the quality of the first image, the number of symbols in the graphical code, and the complexity of the symbols in the graphical code.

A graphical code reader that is configured for concurrent image capture and decoding is also disclosed. The graphical code reader includes a decoding component configured to process a first image by searching for a graphical code within the first image and attempting to decode the graphical code. The graphical code reader also includes an image capture component configured to capture the first image and to capture a second image while the first image is being processed by the decoding component. The graphical code reader also includes a pool of image buffers for temporarily storing the first image and the second image.

Various embodiments of the invention are now described with reference to the Figures, where like reference numbers indicate identical or functionally similar elements. It will be readily understood that the components of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a block diagram illustrating functional components in an embodiment of a graphical code reader 102 that is configured for concurrent image capture and decoding. The illustrated functional components may be implemented using any suitable combination of hardware, software, and/or firmware.

The graphical code reader 102 includes an image capture component 106. The image capture component 106 emits illumination 108 directed at a particular area. Light 110 is reflected from the objects located within the illuminated area. The image capture component 106 receives the reflected light 110 and captures an electronic image 112 of the objects within its field of view. In typical operation, the graphical code reader 102 is positioned so that a graphical code 104 is located within the field of view of the image capture component 106. When this occurs, the image capture component 106 generates an electronic image 112 of the graphical code 104.

The graphical code reader 102 also includes a pool of image buffers 114. Electronic images 112 captured by the image capture component 106 are temporarily stored in the image buffers 114. In the illustrated embodiment, the optimum number of image buffers 114 is three: a first image buffer 114 for the current in-progress image capture, a second image buffer 114 for the last complete image capture, and a third image buffer for use by the decoding component 116. Of course, the graphical code reader 102 may include more than three image buffers 114.

The graphical code reader 102 also includes a decoding component 116. The decoding component 116 retrieves an electronic image 112 from one of the image buffers 114 and processes it in order to decode any graphical codes 104 contained therein. Processing an electronic image 112 typically involves searching for graphical code symbols within the electronic image 112. For each graphical code symbol that is identified, the decoding component 116 determines the data that the graphical code symbol represents. The decoding component 116 then outputs decoded data 118.

In the illustrated embodiment, both the image capture component 106 and the decoding component 116 are configured so that they operate continuously. That is, once the image capture component 106 finishes capturing an electronic image 112, the image capture component 106 starts to capture a new electronic image 112. Similarly, once the decoding component 116 finishes processing an electronic image 112, the decoding component 116 starts to process a new electronic image 112 (if one is available).

Under some circumstances, the image capture component 106 may capture several images in the amount of time that it takes the decoding component 116 to process a single image. This may be the case, for example, when a two-dimensional graphical code 104 is being read, because more time is typically required to process an image 112 of a two-dimensional graphical code 104 than to capture such an image 112. In such an embodiment, after the decoding component 116 has finished processing an image 112, the decoding component 116 may begin processing the newest captured image 112. Because the newest image 112 is processed, some images 112 captured by the image capture component 106 may never be processed. Once all of the image buffers 114 are full, then the oldest image 112 in the image buffers 114 may be deleted in order to make room for a new image 112.

Figure 2:
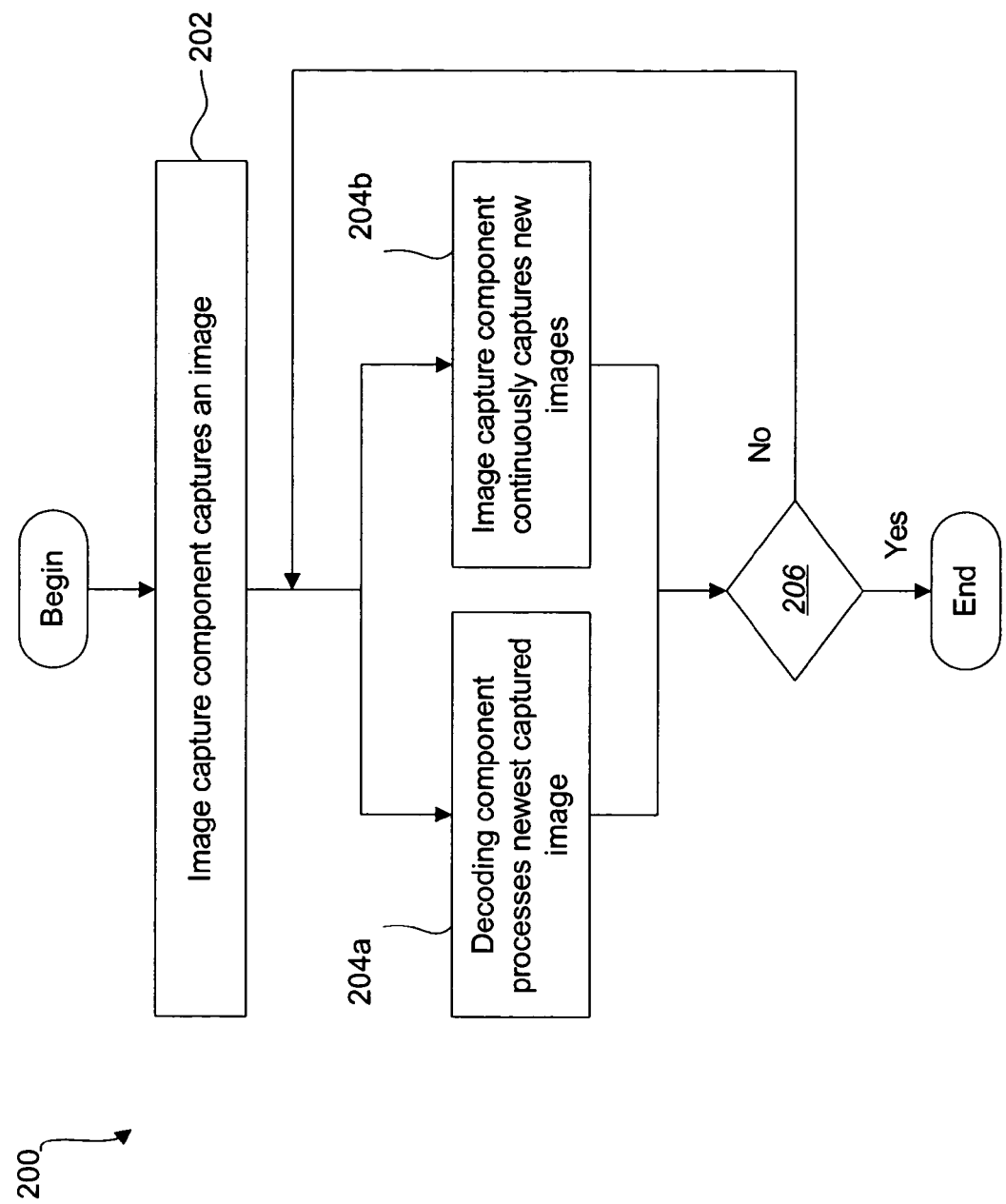
FIG. 2 is a flow diagram illustrating an embodiment of a method for concurrent image capture and decoding.

FIG. 2 is a flow diagram illustrating an embodiment of a method 200 for concurrent image capture and decoding. The method 200 may be performed by the graphical code reader 102 of FIG. 1. The order of the steps of the method 200 is for illustrative purposes only and is not meant to imply a required order.

The method 200 begins when the image capture component 106 captures 202 an electronic image 112 of the objects within its field of view. The electronic image 112 may include a graphical code 104. However, under some circumstances the electronic image 112 may not include a graphical code 104. For example, a user may activate the graphical code reader 102 while the user is moving a graphical code 104 into the field of view of the image capture component 106.

The decoding component 116 then processes 204a the newest captured image 112. At this point in the method 200, the newest captured image is the image 112 captured in step 202. As discussed above, processing 204a an electronic image 112 typically involves searching for graphical-code symbols in the image 112, and then decoding the graphical code symbols. While the decoding component 116 processes 204a the image 112, the image capture component 106 continuously captures 204b new images 112. As discussed above, the image capture component 106 may capture 204b several images 112 in the amount of time that it takes the decoding component 116 to process 204a a single image 112.

After the decoding component 116 finishes processing 204a the newest captured image 112, the decoding component 116 determines 206 whether decoding has been successful. For example, the decoding component 116 may determine whether a graphical code 104 was located in the image 112, and if so, whether the graphical code 104 was successfully decoded. If the decoding component 116 determines 206 that decoding has been successful, the method 200 ends. If not, the method 200 returns to steps 204a, 204b and proceeds as described above.

As mentioned above, when step 204a is executed the first time, the previously captured image 112 is the image 112 captured during step 202. However, during subsequent execution of step 204a, the previously captured image 112 is the newest image 112 captured during the previous execution of step 204b.

Figure 2A:
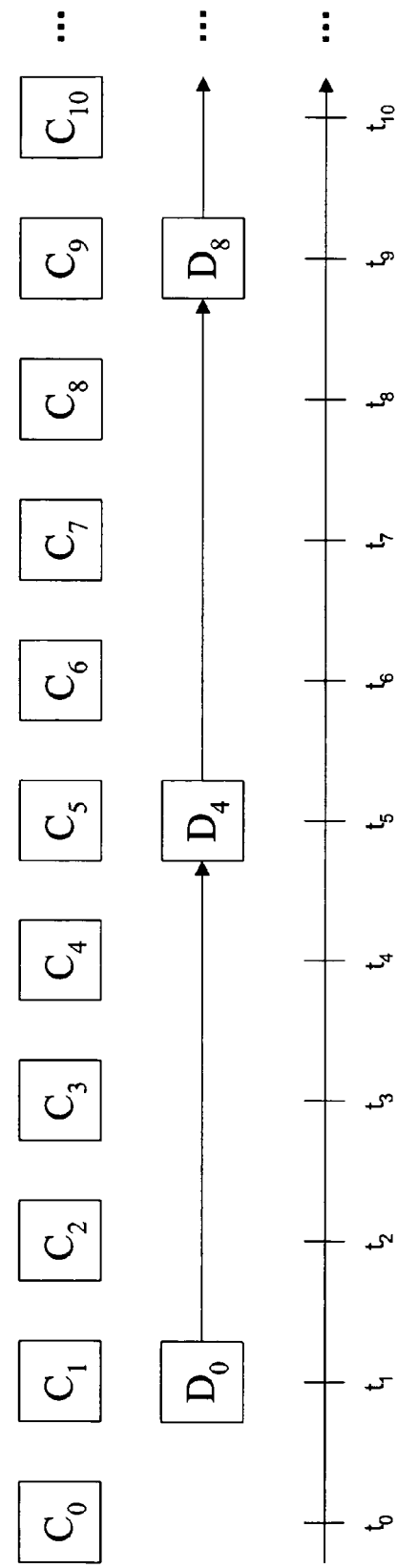
FIG. 2A is a timing diagram illustrating exemplary operation of the image capture component and the decoding component in the embodiment of FIGS. 1-2.

FIG. 2A is a timing diagram illustrating exemplary operation of the image capture component 106 and the decoding component 116 in the embodiment of FIGS. 1-2. In the discussion that follows, $image_i$ refers to the image 112 which the image capture component 106 starts capturing at time $t_i$.

The example begins at time $t_0$. At time $t_0$ the image capture component 106 starts capturing $image_0$. This is indicated by block $C_0$ at time $t_0$.

At time $t_1$ the image capture component 106 has finished capturing $image_0$. The decoding component 116 starts processing the newest captured image, which is $image_0$. This is indicated by block $D_0$ at time $t_1$. In the embodiment of FIGS. 1-2, the image capture component 106 continuously captures new images 112 while the decoding component 116 is processing an image 112. Consequently, the image capture component 106 starts capturing $image_1$ at time $t_1$. This is indicated by block $C_1$ at time $t_1$.

At time $t_2$ the image capture component 106 has finished capturing $image_1$, and starts capturing $image_2$. This is indicated by block $C_2$ at time $t_2$. The decoding component 116 continues processing $image_0$.

At time $t_3$ the image capture component 106 has finished capturing $image_2$, and starts capturing $image_3$. This is indicated by block $C_3$ at time $t_3$. The decoding component 116 continues processing $image_0$.

At time $t_4$ the image capture component 106 has finished capturing $image_3$, and starts capturing $image_4$. This is indicated by block $C_4$ at time $t_4$. The decoding component 116 continues processing $image_0$.

At time $t_5$ the image capture component 106 has finished capturing $image_4$. The decoding component 116 has finished processing $image_0$, which was not successfully decoded. The decoding component 116 starts processing the newest captured image 112, which is $image_4$. This is indicated by block $D_4$ at time $t_5$. The image capture component 106 starts capturing $image_5$. This is indicated by block $C_5$ at time $t_5$.

At time $t_6$ the image capture component 106 has finished capturing $image_5$, and starts capturing $image_6$. This is indicated by block $C_6$ at time $t_6$. The decoding component 116 continues processing $image_4$.

At time $t_7$ the image capture component 106 has finished capturing $image_6$, and starts capturing $image_7$. This is indicated by block $C_7$ at time $t_7$. The decoding component 116 continues processing $image_4$.

At time $t_8$ the image capture component 106 has finished capturing $image_7$, and starts capturing $image_8$. This is indicated by block $C_8$ at time $t_8$. The decoding component 116 continues processing $image_4$.

At time $t_9$ the image capture component 106 has finished capturing $image_8$. The decoding component 116 has finished processing $image_4$, which was not successfully decoded. The decoding component 116 starts processing the newest captured image 112, which is $image_8$. This is indicated by block $D_8$ at time $t_9$. The image capture component 106 starts capturing $image_9$. This is indicated by block $C_9$ at time $t_9$.

At time $t_{10}$ the image capture component 106 has finished capturing $image_9$, and starts capturing $image_{10}$. The decoding component 116 continues processing $image_8$. The image capture component 106 and the decoding component 116 may continue in the above-described manner until the decoding component 116 successfully decodes an image 112.

As can be seen from FIG. 2A, the graphical code reader 102 of FIGS. 1-2 has low latency, i.e., the decoding component 116 is processing newly captured images 112. However, the image capture component 106 is overworked, i.e., it captures a number of images 112 that aren't used. This can adversely affect the performance of the decoding component 116 in a shared bus system.

Figure 3:
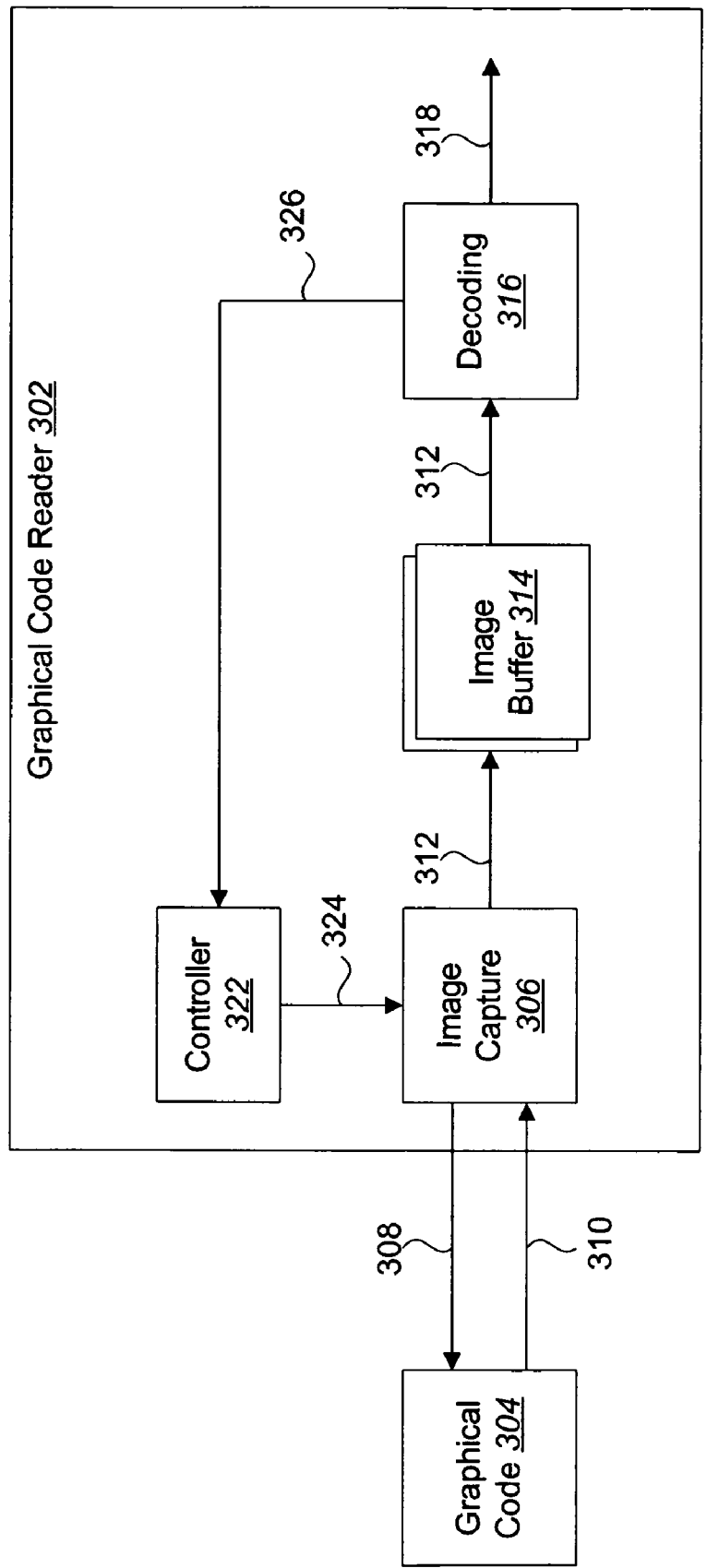
FIG. 3 is a block diagram illustrating functional components in another embodiment of a graphical code reader that is configured for concurrent image capture and decoding.

FIG. 3 is a block diagram illustrating functional components in another embodiment of a graphical code reader 302 that is configured for concurrent image capture and decoding. As with the embodiment described previously, the illustrated functional components may be implemented using any suitable combination of hardware, software, and/or firmware.

The graphical code reader 302 shown in FIG. 3 is similar to the graphical code reader 102 shown in FIG. 1, except for the following. In the embodiment shown in FIG. 3, the image capture component 306 is configured so that it only captures a single new image 312 during the time that the decoding component 316 processes an image 312. The decoding component 316 processes the image 312 that was previously captured by the image capture component 306. This functionality may be accomplished by means of a controller 322, as shown in FIG. 3. In the illustrated embodiment, the image capture component 306 is configured so that it captures electronic images 312 in accordance with image capture instructions 324 received from the controller 322. The image capture component 306 does not otherwise capture images 312.

When the decoding component 316 finishes processing an image 312 without successfully decoding the image 312, the decoding component 316 immediately starts to process the next image 312 if the next image 312 is available. (If the next image 312 is not available, the decoding component 316 waits until the next image 312 becomes available.) The decoding component 316 provides a signal 326 to the controller 322 indicating that the decoding component 316 is now starting to process the next image 312. After receiving the signal 326 from the decoding component 316, the controller 322 sends a signal 324 to the image capture component 306 instructing the image capture component 306 to start capturing a new image 312.

The graphical code reader 302 shown in FIG. 3 includes a pool of image buffers 314. In the illustrated embodiment, the optimum number of image buffers 314 is two: a first image buffer 314 for the current in-progress image capture, and a second image buffer 314 for use by the decoding component 316. At any given time, one image buffer 314 is allocated for image capture and the other image buffer 314 is allocated for decoding. On the next frame, the buffer 314 that was the decoding buffer 314 becomes the capture buffer 314, and the buffer 314 that was the capture buffer 314 becomes the decode buffer 314. Of course, the graphical code reader 302 may include more than two image buffers 314.

Figure 4:
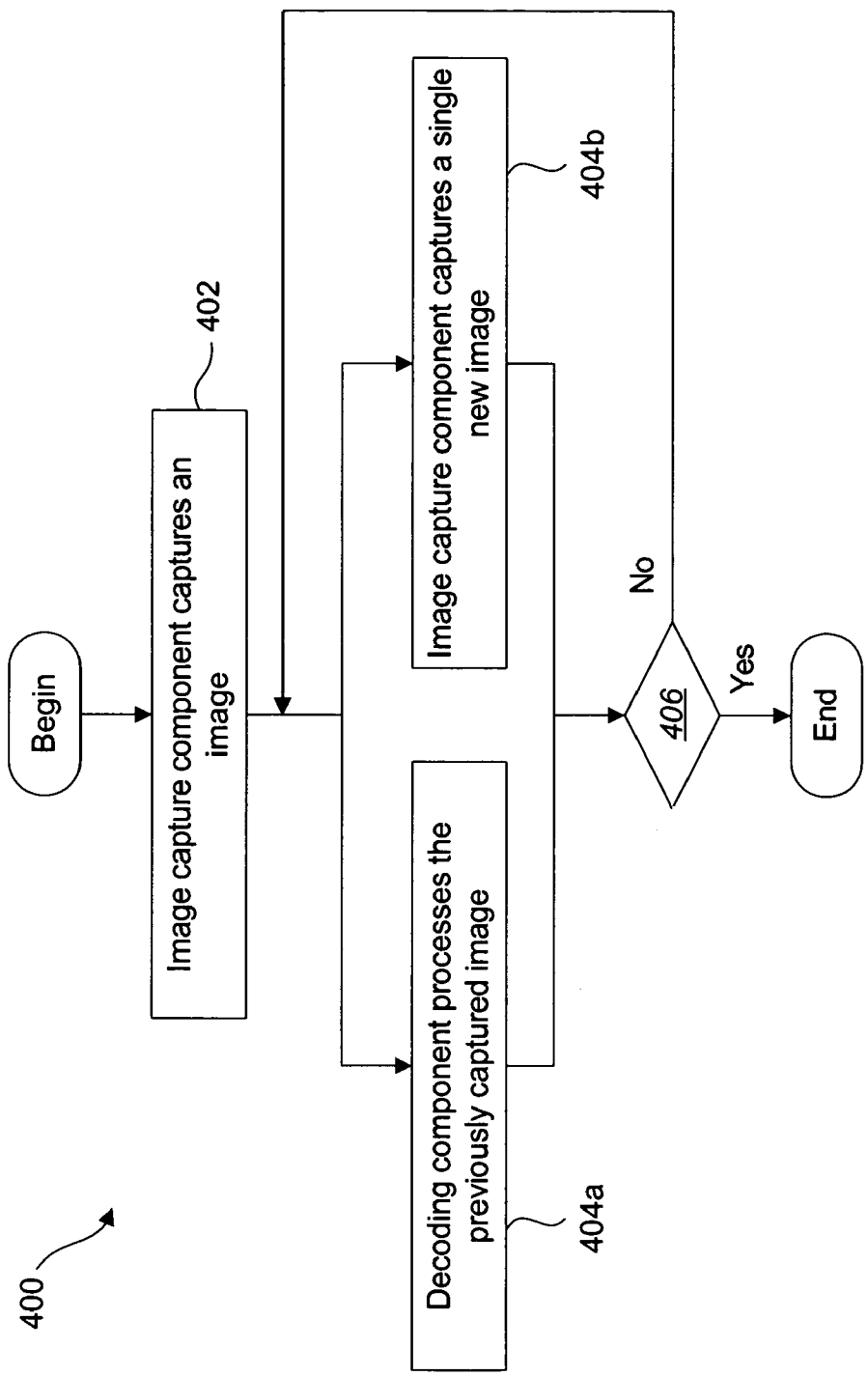
FIG. 4 is flow diagram illustrating another embodiment of a method for concurrent image capture and decoding.

FIG. 4 is flow diagram illustrating another embodiment of a method 400 for concurrent image capture and decoding.

The method 400 may be performed by the graphical code reader 302 of FIG. 3. The order of the steps of the method 400 is for illustrative purposes only and is not meant to imply a required order.

The method 400 begins when the image capture component 306 captures 402 an electronic image 312 of the objects within its field of view. After the image 312 has been captured and is available for processing, the decoding component 316 processes 404a the image 312 and the image capture component 306 captures 404b a single new image 312. The steps 404a, 404b are performed substantially in parallel. Typically, it takes longer for the decoding component 316 to process an image 312 than it takes for the image capture component 306 to capture an image 312. Thus, in typical operation, the image capture component 306 finishes capturing a new image 312 before the decoding component 306 finishes processing the previously captured image 312.

After the decoding component 316 finishes processing 404a the image 312, the decoding component 316 determines 406 whether decoding has been successful. If the decoding component 316 determines 306 that decoding has been successful, the method 400 ends. If not, the method 400 returns to steps 404a, 404b and proceeds as described above.

When step 404a is executed the first time, the decoding component 316 processes 404a the image 312 captured during step 402. During subsequent execution of step 404a, the decoding component 316 processes 404a the image 312 captured during the previous execution of step 404b.

Figure 4A:
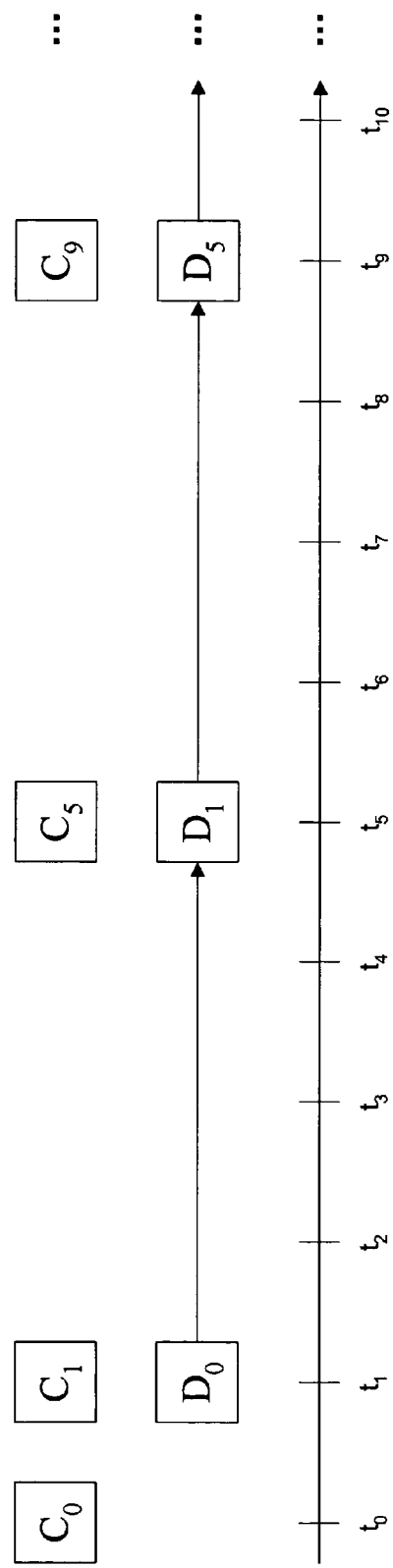
FIG. 4A is a timing diagram illustrating exemplary operation of the image capture component and the decoding component in the embodiment of FIGS. 3-4.

FIG. 4A is a timing diagram illustrating exemplary operation of the image capture component 306 and the decoding component 316 in the embodiment of FIGS. 3-4. The example begins at time $t_0$. At time $t_0$ the image capture component 306 starts capturing image$_0$. This is indicated by block $C_0$ at time $t_0$.

At time $t_1$ the image capture component 306 has finished capturing image$_0$. The decoding component 316 starts processing image$_0$. This is indicated by block $D_0$ at time $t_1$. In the embodiment of FIGS. 3-4, the image capture component 306 captures a single new image 312 when the decoding component 316 starts processing an image 312. Consequently, the image capture component 306 starts capturing image, at time $t_1$. This is indicated by block C, at time $t_1$.

At time $t_2$ the image capture component 306 has finished capturing image$_1$. However, the decoding component 316 has not finished processing image$_0$, so the image capture component 306 remains idle and does not start capturing a new image 312. The decoding component 316 continues processing image$_0$.

At times $t_3$ and $t_4$ the image capture component 306 remains idle. The decoding component 316 continues processing image$_0$.

At time $t_5$ the decoding component 316 has finished processing image$_0$, which was not successfully decoded. The decoding component 316 starts processing image$_1$. This is indicated by block $D_1$ at time $t_5$. The image capture component 306 starts capturing image$_5$. This is indicated by block $C_5$ at time $t_5$.

At time $t_6$ the image capture component 306 has finished capturing image$_5$. However, the decoding component 316 has not finished processing image$_1$, so the image capture component 306 remains idle and does not start capturing a new image 312. The decoding component 316 continues processing image$_1$.

At times $t_7$ and $t_8$ the image capture component 306 remains idle. The decoding component 316 continues processing image$_1$.

At time $t_9$ the decoding component 316 has finished processing image$_1$, which was not successfully decoded. The decoding component 316 starts processing image$_5$. This is indicated by block $D_5$ at time $t_9$. The image capture component 306 starts capturing image$_9$. This is indicated by block $C_9$ at time $t_9$.

At time $t_{10}$ the image capture component 306 has finished capturing image$_9$. However, the decoding component 316 has not finished processing image$_5$, so the image capture component 306 remains idle and does not start capturing a new image 312. The decoding component 316 continues processing image$_5$. The image capture component 306 and the decoding component 316 may continue in the above-described manner until the decoding component 316 successfully decodes an image 312.

As can be seen from FIG. 4A, in the graphical code reader 302 of FIGS. 3-4 the image capture component 306 does not capture unnecessary images 312, thereby sparing the bus from unneeded captures. However, the reader 302 has higher latency, i.e., the decoding component 316 is processing aged images 312.

Figure 5:
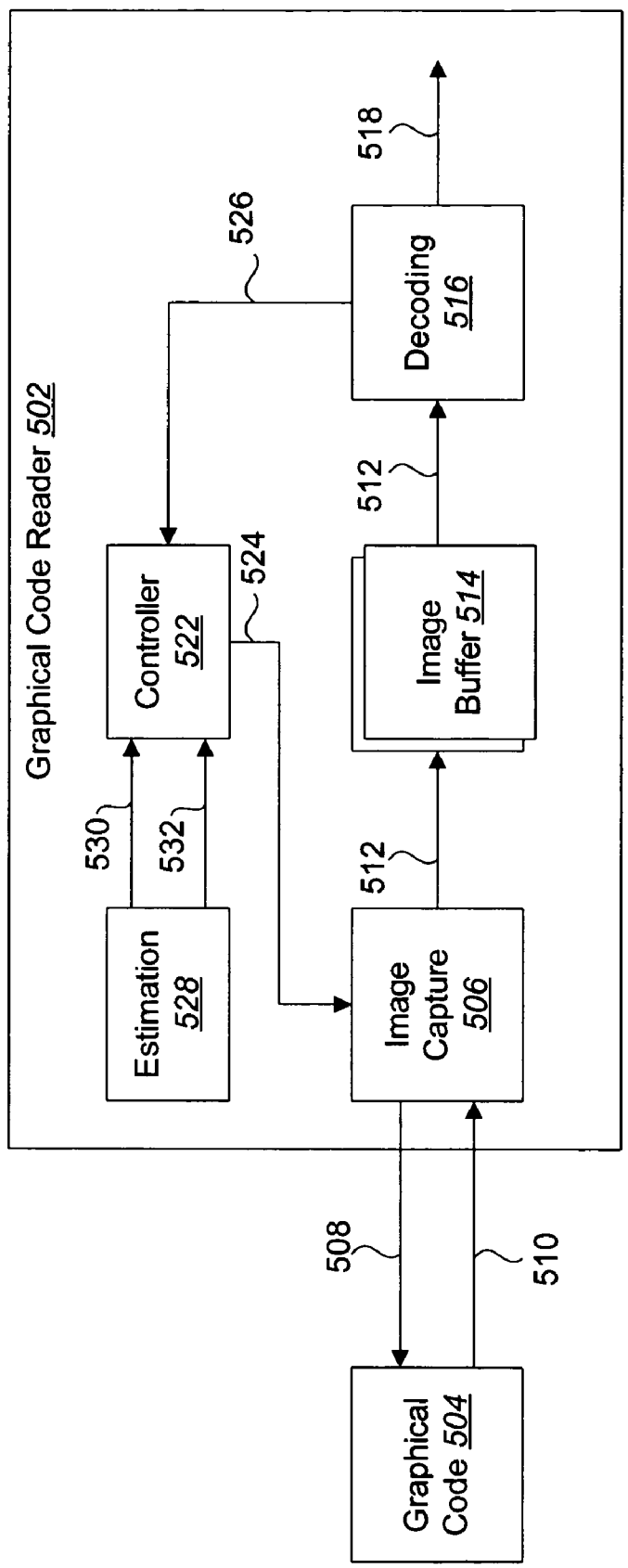
FIG. 5 is a block diagram illustrating functional components in another embodiment of a graphical code reader that is configured for concurrent image capture and decoding.

FIG. 5 is a block diagram illustrating functional components in another embodiment of a graphical code reader 502 that is configured for concurrent image capture and decoding. As in the embodiments described previously, the illustrated functional components may be implemented using any suitable combination of hardware, software, and/or firmware.

The graphical code reader 502 shown in FIG. 5 is similar to the graphical code reader 302 shown in FIG. 3, except for the following. In the embodiment shown in FIG. 5, the graphical code reader 502 is configured so that the image capture component 506 finishes capturing a single new image 512 at about the same time that the decoding component 516 finishes processing the previously captured image 512. In this way, the decoding component 516 will always be processing the most current image 512 that is available.

In the illustrated embodiment, this functionality is accomplished by means of an estimation component 528. The estimation component 528 generates a processing estimate 530, which is an estimate of how long it will take for the decoding component 516 to process an entire image 512. The estimation component 528 also generates a capture estimate 532, which is an estimate of how long it will take for the image capture component 506 to capture an image 512. The processing estimate 530 is p time units in duration, and the capture estimate 532 is c time units in duration. The estimation component 528 provides the processing estimate 530 and the capture estimate 532 to the controller 522.

As before, when the decoding component 516 finishes processing an image 512 without successfully decoding the image 512, the decoding component 516 immediately starts to process the next image 512 if the next image 512 is available. (If the next image 512 is not available, the decoding component 516 waits until the next image 512 becomes available.) The decoding component 516 provides a signal 526 to the controller 522 indicating that the decoding component 516 is now starting to process the next image 512.

The controller 522 sends image capture instructions 524 to the image capture component 506. The image capture instructions 524 instruct the image capture component 506 to start capturing a single new image 512 p–c time units after the decoding component 516 starts to process the previously captured image 512.

The graphical code reader 502 shown in FIG. 5 includes a pool of image buffers 514. In the illustrated embodiment, the optimum number of image buffers 514 is two: a first image buffer 514 for the current in-progress image capture, and a second image buffer 514 for use by the decoding component 516. Of course, the graphical code reader 502 may include more than two image buffers 514.

FIG. 6 is a flow diagram illustrating another embodiment of a method 600 for concurrent image capture and decoding. The method 600 may be performed by the graphical code reader 502 of FIG. 5. The order of the steps of the method 600 is for illustrative purposes only and is not meant to imply a required order.

The method 600 begins when the estimation component 528 provides 602 a processing estimate 530 and a capture estimate 532. The processing estimate 530 is p time units in duration, and the capture estimate 532 is c time units in duration.

The processing estimate 530 might be based on statistical samplings of observed decode times for "typical" codes 502 and images 512. For example, the estimate may be the average decode time or some higher threshold, such as the time where a certain percentage (e.g., 75%) of samples were completed. The processing estimate 530 might be a linear function of quality and/or image size (or window-of-interest within the image 512). The processing estimate 530 might be based on details about how the image 512 is processed in the decoding component 516, which would be known to those skilled in the art of decoding graphical codes 502 from captured images 512. The processing estimate 530 might also be based on a combination of the above, and/or on additional factors not mentioned above. The capture estimate 532 may be calculated according to the following formula: (image size/average transfer rate)+start-capture latency.

The image capture component 506 captures 604 an electronic image 512 of the objects within its field of view. After the image 512 has been captured and is available for processing, the decoding component 516 starts processing 606 the image 512. The image capture component 506 starts capturing 608 a single new image 512 p–c time units after the decoding component 516 starts processing the previously captured image 512.

If the processing estimate p is accurate, the decoding component 616 finishes processing the previously captured image 512 at substantially the same time that the image capture component 506 finishes capturing the single new image 512. Of course, under some circumstances the processing estimate p may not be accurate, and the decoding component 516 may finish processing the image 512 either before or after the image capture component 506 finishes capturing the new image 512.

After the decoding component 516 finishes processing the previously captured image 512, the decoding component 516 determines 610 whether decoding has been successful. If decoding has been successful, the method 600 ends. If decoding has not been successful, the method 600 returns to step 606 and proceeds as described above.

When step 606 is executed the first time, the decoding component 516 processes 606 the image 512 captured during step 604. During subsequent execution of step 606, the decoding component 516 processes 606 the image 512 captured during the previous execution of step 608.

Figure 6A:
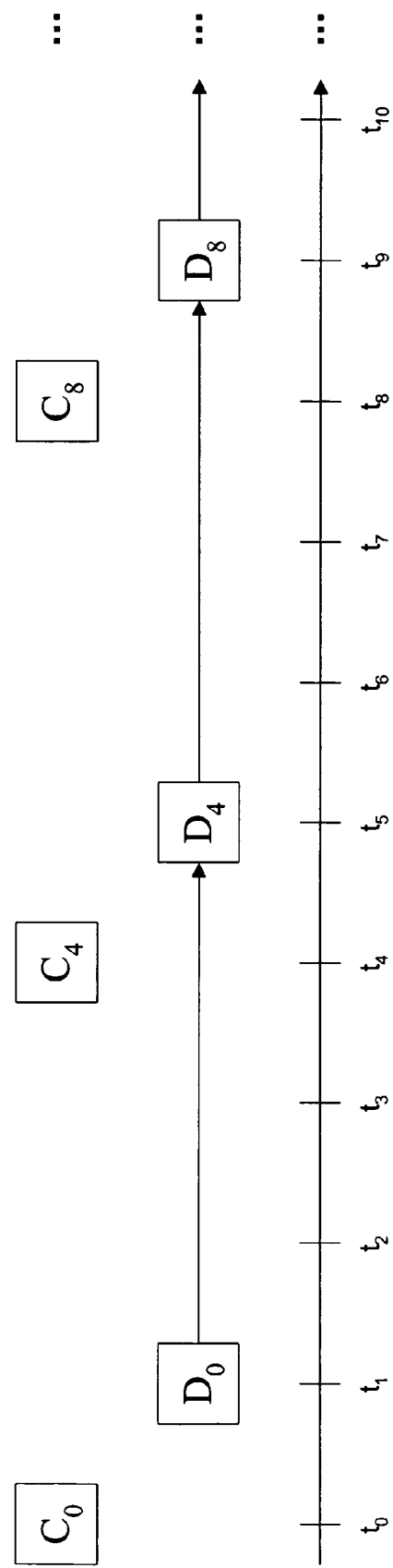
FIG. 6A is a timing diagram illustrating exemplary operation of the image capture component and the decoding component in the embodiment of FIGS. 5-6.

FIG. 6A is a timing diagram illustrating exemplary operation of the image capture component 506 and the decoding component 516 in the embodiment of FIGS. 5-6. The example begins at time $t_0$. At time $t_0$ the image capture component 506 starts capturing image$_0$. This is indicated by block $C_0$ at time $t_0$.

At time $t_1$ the image capture component 506 has finished capturing image$_0$. The decoding component 516 starts processing image$_0$. This is indicated by block $D_0$ at time $t_1$. In the embodiment of FIGS. 5-6, the image capture component 506 starts capturing a single new image 512 p–c time units after the decoding component 516 starts processing the current image 512. Consequently, the image capture component 506 remains idle at time $t_1$ and does not start capturing a new image 512.

At times $t_2$ and $t_3$ the image capture component 506 remains idle. The decoding component 516 continues processing image$_0$.

At time $t_4$ p–c time units have elapsed since the decoding component 516 started processing image$_0$. Consequently, the image capture component 506 starts capturing image$_4$. This is indicated by block $C_4$ at time $t_4$. The decoding component 516 continues processing image$_0$.

At time $t_5$ the decoding component 516 has finished processing image$_0$, which was not successfully decoded. The image capture component 506 has finished capturing image$_4$. The decoding component 516 starts processing image$_4$. This is indicated by block $D_4$ at time $t_5$. The image capture component 506 remains idle at time $t_5$ and does not start capturing a new image 512.

At times $t_6$ and $t_7$ the image capture component 506 remains idle. The decoding component 516 continues processing image$_4$.

At time $t_8$ p–c time units have elapsed since the decoding component 516 started processing image$_4$. Consequently, the image capture component 506 starts capturing image$_8$. This is indicated by block $C_8$ at time $t_8$. The decoding component 516 continues processing image$_4$.

At time $t_9$ the decoding component 516 has finished processing image$_4$, which was not successfully decoded. The image capture component 506 has finished capturing image$_8$. The decoding component 516 starts processing image$_8$. This is indicated by block $D_8$ at time $t_9$. The image capture component 506 remains idle at time $t_9$ and does not start capturing a new image 512.

At time $t_{10}$ the image capture component 506 remains idle. The decoding component 516 continues processing image$_8$. The image capture component 506 and the decoding component 516 may continue in the above-described manner until the decoding component 516 successfully decodes an image 512.

As can be seen from FIG. 6A, in the graphical code reader 502 of FIGS. 5-6 the image capture component 506 does not capture unnecessary images 512, thereby sparing the bus from unneeded captures. In addition, the reader 502 has low latency, i.e., the decoding component 516 is processing newly captured images 512.

Figure 7:
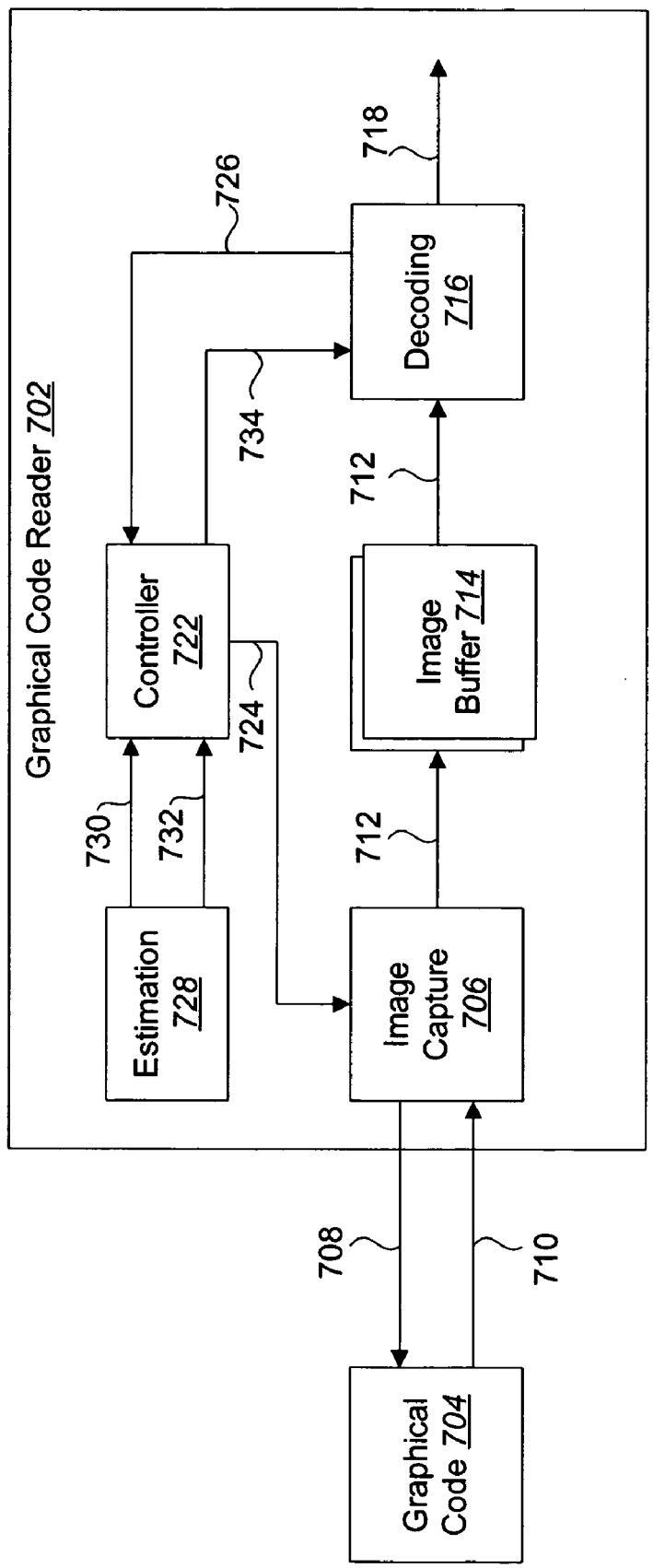
FIG. 7 is a block diagram illustrating functional components in another embodiment of a graphical code reader that is configured for concurrent image capture and decoding.

FIG. 7 is a block diagram illustrating functional components in another embodiment of a graphical code reader 702 that is configured for concurrent image capture and decoding. As in the embodiments described previously, the illustrated functional components may be implemented using any suitable combination of hardware, software, and/or firmware.

The graphical code reader 702 shown in FIG. 7 is similar to the graphical code reader 502 shown in FIG. 5, except for the following. In the embodiment shown in FIG. 7, the decoding component 716 is configured to first process the portions of an image 712 that have the highest probability of including a graphical code 704. This is sometimes referred to as processing the "best candidates" before the "worst candidates." For example, a simplistic best candidate choice would be to start analysis of an image 712 at the center and work outward, because the operator of the graphical code reader 702 typically attempts to place the code 704 in the center of the field of view of the image capture component 706. Another approach would be to examine the image 712 at low resolution to locate and rank candidate areas and then examine each candidate area at high resolution. Whatever approach is followed, the decoding component 716 may be thought of as having high probability decoding time followed by lower probability decoding time. In the embodiment shown in FIG. 7, the graphical code reader 702 is configured so that the decoding component 716 stops processing images 712 after the high probability time has elapsed and before the lower probability time begins.

This functionality may be implemented by means of the estimation component 728. More specifically, the processing estimate (p) 730 generated by the estimation component 728 may be an estimate of how long it will take for the decoding component 716 to process the portion of an image 712 that is most likely to include a graphical code 704. The controller 722 sends a signal 734 to the decoding component 716 which instructs the decoding component 716 to stop processing a particular image 712 p time units after the decoding component 716 starts to process the image 712. By limiting the amount of time the decoding component 716 processes images 712, the use of high probability time is maximized and the use of less-efficient low probability time is minimized.

The graphical code reader 702 shown in FIG. 7 includes a pool of image buffers 714. In the illustrated embodiment, the optimum number of image buffers 714 is two: a first image buffer 714 for the current in-progress image capture, and a second image buffer 714 for use by the decoding component 716. Of course, the graphical code reader 702 may include more than two image buffers 714.

Figure 8:
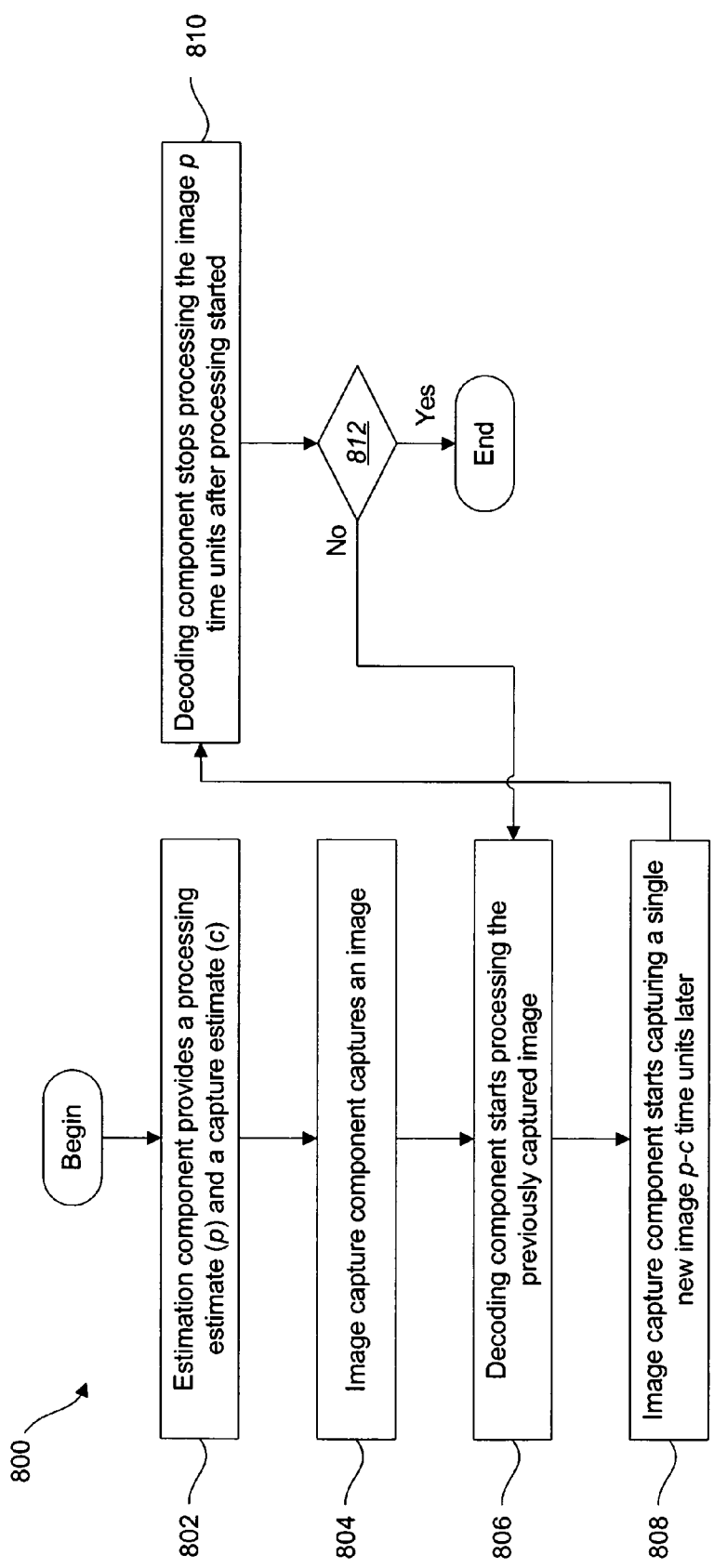
FIG. 8 is flow diagram illustrating another embodiment of a method for concurrent image capture and decoding.

FIG. 8 is flow diagram illustrating another embodiment of a method 800 for concurrent image capture and decoding. The method 800 may be performed by the graphical code reader 702 of FIG. 7. The order of the steps of the method 800 is for illustrative purposes only and is not meant to imply a required order.

The method 800 shown in FIG. 8 is similar in many respects to the method 600 shown in FIG. 6. The method 800 begins when the estimation component 728 provides 802 a processing estimate 530 and a capture estimate 532. The processing estimate 730 is p time units in duration, and the capture estimate 732 is c time units in duration. The image capture component 706 captures 804 an electronic image 712 of the objects within its field of view. After the image 712 has been captured and is available for processing, the decoding component 716 starts processing 806 the image 712. The image capture component 706 starts capturing 808 a single new image 712 p–c time units after the decoding component 716 starts processing the previously captured image 712.

In the illustrated embodiment, the decoding component 716 stops processing 810 the current image p time units after processing started, whether or not the decoding component 716 is finished processing the entire image 712. Thus, if the capture estimate c is accurate, the image capture component 706 finishes capturing a new image 712 when the decoding component 716 stops processing the previously captured image 712. Of course, under some circumstances the capture estimate c may not be correct, and the image capture component 706 may finish capturing a new image 712 either before or after the decoding component 716 stops processing the previously captured image 712.

The decoding component 716 then determines 812 whether decoding has been successful. If decoding has been successful, the method 800 ends. If decoding has not been successful, the method 800 returns to step 806 and proceeds as described above.

When step 806 is executed the first time, the decoding component 716 processes 806 the image 712 captured during step 804. During subsequent execution of step 806, the decoding component 716 processes 806 the image 712 captured during the previous execution of step 808.

In the embodiment described in connection with FIGS. 7-8, the processing estimate 730 may be a function of the quality of the image 712, the number of symbols in the graphical code 704, the complexity of the symbols, details about how the image 712 is processed in the decoding component 716, and so forth. The quality of the image 712 generally includes the contrast of the image 712 and may also include other factors that vary by symbology and details about how the image 712 is processed in the decoding component 716. A user-configurable factor and offset may also be provided for tailoring this estimate 730 for specific conditions.

An example of how the processing estimate 730 may be calculated is:

processing estimate=$c0+c1$*quality+
 $c2$*numberOfSymbologiesEnabled+
 $c3$*complexityOfSymbols+
 $c4$*numberOfConcurrentSymbols where $c0$-$c4$ are tunable parameters (user selectable). The complexityOfSymbols variable refers to the number of features in the symbols to be decoded (e.g., a datamatrix code can be as small as 10×10 features or up to as large as 100×100 or more). The numberOfConcurrentSymbols variable refers to how many distinct symbols should be decoded within a single image 712.

Figure 9:
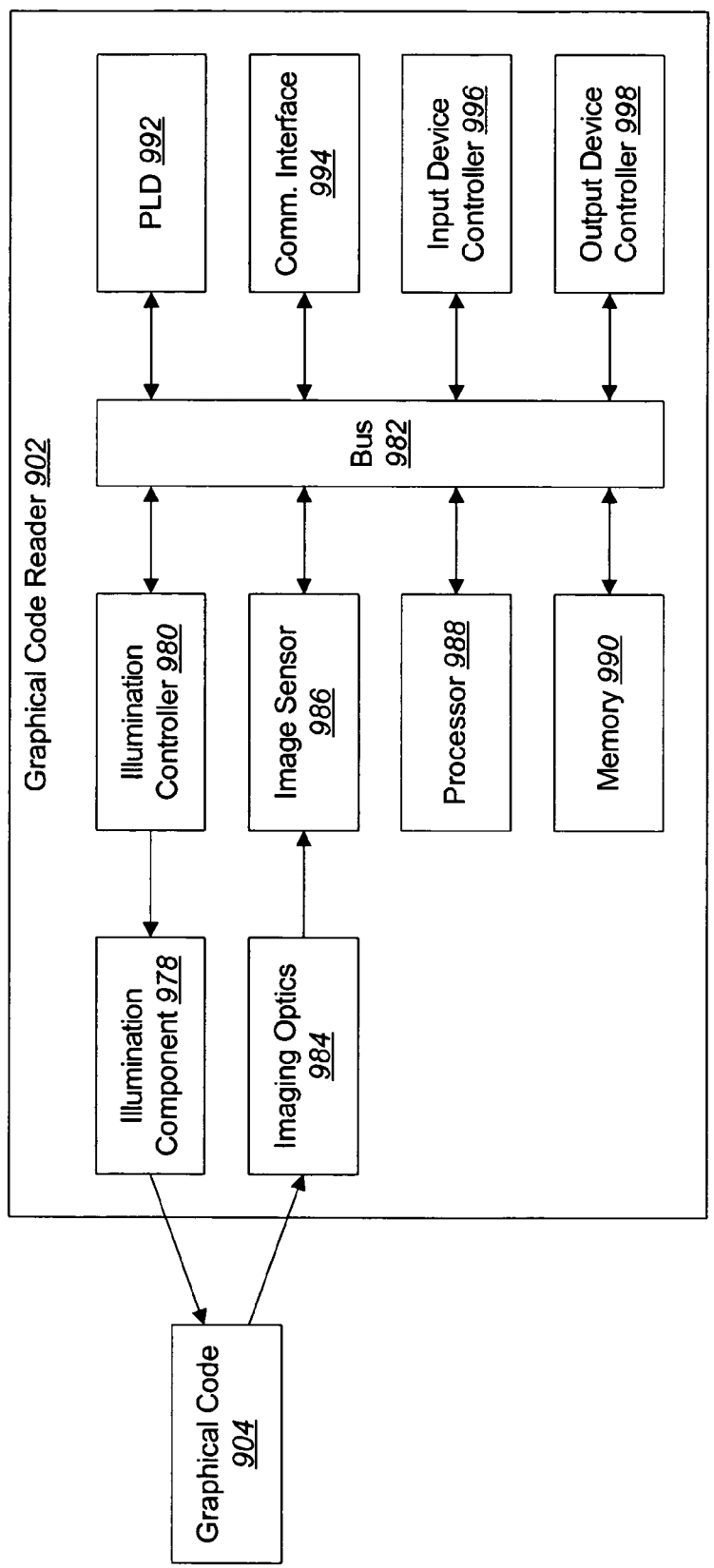
FIG. 9 is a block diagram illustrating physical components in an embodiment of a graphical code reader.

FIG. 9 is a block diagram illustrating physical components in an embodiment of a graphical code reader 902. The physical components shown in FIG. 9 may be used to implement the functional components described previously. The different components may be located within the same physical structure or in separate physical structures.

The graphical code reader 902 includes an illumination component 978. The illumination component 978 typically includes a plurality of illumination elements that may be activated to illuminate a graphical code 904. The illumination component 978 is controlled by an illumination controller 980, which is in electronic communication with other components in the graphical code reader 902 via a system bus 982.

The graphical code reader 902 also includes imaging optics 984 and an image sensor 986. The image sensor 986 includes a plurality of light-sensitive elements. The imaging optics 984 focus light reflected from the area illuminated by the illumination component 978 onto the image sensor 986. Examples of image sensors 986 include charge coupled devices (CCDs) and complementary metal-oxide semiconductor (CMOS) sensors. A housing (not shown) is typically also provided for shielding the light-sensitive elements in the image sensor 986 from ambient light. The image sensor 986 is in electronic communication with other components in the graphical code reader 902 via the system bus 982.

The graphical code reader 902 also includes a processor 988 and memory 990. The processor 988 controls the operation of the graphical code reader 902 and may be embodied as a microprocessor, a microcontroller, a digital signal processor (DSP) or other device known in the art. The processor 988 typically performs logical and arithmetic operations based on program instructions stored within the memory 990.

As used herein, the term "memory" 990 is broadly defined as any electronic component capable of storing electronic information, and may be embodied as read only memory (ROM), random access memory (RAM), magnetic disk storage media, optical storage media, flash memory devices in RAM, on-board memory included with the processor 988, EPROM memory, EEPROM memory, registers, etc. The memory 990 typically stores program instructions and other types of data. The program instructions may be executed by the processor 988 to implement some or all of the methods disclosed herein. The processor 988 and memory 990 are in electronic communication with other components in the graphical code reader 902 via the system bus 982.

The graphical code reader 902 typically also includes one or more programmable logic devices (PLDs) 992. The PLDs 992 may be programmed to carry out logic functions that implement, either partially or completely, some or all of the methods disclosed herein. Examples of different types of PLDs 992 that may be used include field-programmable gate arrays (FPGAs), logic-cell arrays (LCAs), programmed arrays of logic (PALs), complex programmable-logic devices (CPLDs), and so forth. The PLDs 992 are in electronic communication with other components in the graphical code reader 902 via the system bus 982. Those skilled in the art will recognize that one or more application-specific integrated circuits (ASICs) may be used in place of or in addition to the PLDs 992.

The graphical code reader 902 typically also includes one or more communication interfaces 994 for communicating with other electronic devices. The communication interfaces 994 may be based on wired communication technology, wireless communication technology, or both. Examples of different types of communication interfaces 994 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth. The communication interfaces 994 are in electronic communication with other components in the graphical code reader 902 via the system bus 982.

The graphical code reader 902 typically also includes one or more input device controllers 996 for controlling input devices, such as keys, buttons, etc. The graphical code reader 902 typically also includes one or more output device controllers 998 for controlling output devices, such as a display screen. The input device controllers 996 and output device controllers 998 are in electronic communication with other components in the graphical code reader 902 via the system bus 982.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a graphical code reader, a method for concurrent image capture and decoding, comprising:
    using a graphical code reader to carry out the steps of:
    capturing a first image;
    processing the first image by searching for a graphical code within the first image and attempting to decode the graphical code;
    capturing a second image while the first image is being processed;
    determining an estimated processing time p for processing at least some of the first image; and
    determining an estimated capture time c for capturing the second image;
    wherein the capturing of the second image starts p–c time units after the processing of the first image starts.

2. The method of claim 1, wherein the estimated processing time p is an estimate of an amount of time required to process the entire first image.

3. The method of claim 1, wherein the estimated processing time p is an estimate of an amount of time required to process a portion of the first image.

4. The method of claim 3, wherein the estimated processing time p is a function of at least one of the quality of the first image, the number of symbols in the graphical code, and the complexity of the symbols in the graphical code.

5. The method of claim 1, further comprising stopping the processing of the first image p time units after the processing of the first image starts.

6. A graphical code reader that is configured for concurrent image capture and decoding, comprising:
    a decoding component configured to process a first image by searching for a graphical code within the first image and attempting to decode the graphical code;
    an image capture component configured to capture the first image and to capture a second image while the first image is being processed by the decoding component;
    a pool of image buffers for temporarily storing the first image and the second image; and
    an estimation component configured to determine an estimated processing time p for processing at least some of the first image and an estimated capture time c for capturing the second image;
    wherein the image capture component staffs capturing the second image p–c time units after the decoding component starts processing the first image.

7. The graphical code reader of claim 6, wherein the estimated processing time p is an estimate of an amount of time required to process the entire first image.

8. The graphical code reader of claim 6, wherein the estimated processing time p is an estimate of an amount of time required to process a portion of the first image.

9. The graphical code reader of claim 8, wherein the estimated processing time p is a function of at least one of the quality of the first image, the number of symbols in the graphical code, and the complexity of the symbols in the graphical code.

10. The graphical code reader of claim 6, wherein the decoding component stops processing the first image p time units after the decoding component starts processing the first image.

* * * * *